United States Patent
Li et al.

(10) Patent No.: US 9,570,211 B2
(45) Date of Patent: Feb. 14, 2017

(54) TRANSPARENT THERMOPLASTIC COMPOSITION WITH IMPROVED ELECTRICAL CONDUCTIVITY IN THE MELT

(75) Inventors: Xiangyang Li, Seven Fields, PA (US); James P. Mason, Carnegie, PA (US)

(73) Assignee: Covestro LLC, Pittsburgh, PA (US)

( * ) Notice: Subject to any disclaimer, the term of this patent is extended or adjusted under 35 U.S.C. 154(b) by 259 days.

(21) Appl. No.: 12/199,056

(22) Filed: Aug. 27, 2008

(65) Prior Publication Data

US 2010/0051882 A1  Mar. 4, 2010

(51) Int. Cl.
*H01B 1/12* (2006.01)
*C08K 5/103* (2006.01)
*C08K 5/42* (2006.01)

(52) U.S. Cl.
CPC ............ *H01B 1/122* (2013.01); *C08K 5/103* (2013.01); *C08K 5/42* (2013.01)

(58) Field of Classification Search
CPC ......... C08L 67/02; C08L 67/102; C08G 63/64
USPC ...... 252/519.34; 524/108, 166; 525/88, 133, 525/438, 101, 437; 528/203; 264/176.1
See application file for complete search history.

(56) References Cited

U.S. PATENT DOCUMENTS

| | | | |
|---|---|---|---|
| 5,360,658 A | 11/1994 | Schmitz et al. | |
| 5,681,905 A * | 10/1997 | Mason et al. | 525/438 |
| 6,462,111 B1 * | 10/2002 | Singh et al. | 524/108 |
| 6,740,697 B1 * | 5/2004 | Brenner et al. | 524/166 |
| 6,914,092 B1 | 7/2005 | Doebler et al. | |
| 7,220,792 B2 | 5/2007 | Dean et al. | |
| 7,326,764 B2 * | 2/2008 | Di | C08G 63/64 264/176.1 |
| 2002/0115792 A1 * | 8/2002 | Verhoogt et al. | 525/133 |
| 2003/0031844 A1 | 2/2003 | Gorny et al. | |
| 2005/0049360 A1 * | 3/2005 | Okamoto | 525/88 |
| 2005/0137358 A1 * | 6/2005 | Zhang | C08L 67/02 525/437 |
| 2006/0036035 A1 * | 2/2006 | Govaerts et al. | 525/101 |
| 2007/0049703 A1 | 3/2007 | Murray et al. | |
| 2007/0072961 A1 | 3/2007 | Ma et al. | |
| 2008/0119631 A1 * | 5/2008 | Mullen | 528/203 |
| 2008/0153994 A1 * | 6/2008 | Lens et al. | 525/446 |
| 2010/0051882 A1 * | 3/2010 | Li et al. | 252/519.34 |

FOREIGN PATENT DOCUMENTS

| | | |
|---|---|---|
| JP | 4911949 A | 2/1974 |
| JP | 8302165 A | 11/1996 |
| JP | 200355544 A | 2/2003 |
| JP | 2003176404 A | 6/2003 |
| JP | 200483831 A | 3/2004 |
| JP | 2005146225 A | 6/2005 |
| JP | 2005272663 A | 10/2005 |
| JP | 2006257177 A | 9/2006 |
| JP | 200763361 A | 3/2007 |
| JP | 2007153932 A | 6/2007 |
| JP | 2007277337 A | 10/2007 |
| JP | 200881708 A | 4/2008 |
| JP | 2008115250 A | 5/2008 |
| JP | 2008115253 A | 5/2008 |
| KR | 20040056713 A | 7/2004 |
| WO | 2007008476 A2 | 1/2007 |
| WO | 2007081536 A1 | 7/2007 |
| WO | 2008013579 A2 | 1/2008 |
| WO | 2008060714 A2 | 5/2008 |
| WO | 2009029779 A1 | 3/2009 |

OTHER PUBLICATIONS

"Modern Polyesters Chemistry and Technology of Polyesters and Copolyesters" Chapter 8, Section 4, John Scheirs and Timothy E. Long (eds.) published by John Wiley & Sons.

* cited by examiner

*Primary Examiner* — Khanh Tuan Nguyen
(74) *Attorney, Agent, or Firm* — Richard P. Bender

(57) ABSTRACT

The present invention provides a transparent thermoplastic molding composition made from a transparent blend of a polycarbonate resin with a polyester resin, 0.005 to 2 weight percent, based on the weight of the composition, of a perfluoroalkylsulfonic acid salt of the formula (I): $(RA-SO_3^-)_n X^{n+}$ (I), wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements, and 0 to 5 weight percent, based on the weight of the composition, of a glycerol monostearate. The inventive composition has a total transmittance according to ASTM D-1003 of greater than 84% and an electric resistivity according to ASTM D-257 of less than about 2.5E+06 ohm-m.

17 Claims, No Drawings

US 9,570,211 B2

TRANSPARENT THERMOPLASTIC COMPOSITION WITH IMPROVED ELECTRICAL CONDUCTIVITY IN THE MELT

FIELD OF THE INVENTION

The present invention relates, in general, to thermoplastic resins, and more specifically, to transparent thermoplastic compositions which exhibit improved electrical conductivity.

BACKGROUND OF THE INVENTION

JP 2008-115253 describes an antistatic polycarbonate resin composition that is said to be excellent in thermal stability and transparency. The polycarbonate composition contains a phosphonium salt and an antioxidant or a phosphite and an antioxidant.

JP 2008-115250 provides an antistatic property polycarbonate resin composition which is said to be excellent in thermal stability and transparency. The polycarbonate resin contains a diglycerol fatty acid ester a phosphite and an antioxidant.

JP 2008-081708 describes an antistatic polycarbonate resin composition made of (A) the polycarbonate resin of 100 pts. wt., (B) a phosphonium salt of a specified organic sulfonic acid as the antistatic agent of 0.1-20 pts. wt. and (C) a specified UV absorber of 0.01-0.8 pts. wt. Molded articles made from the composition are said to have transparency, less initial discoloring and are also said to be superior in antistatic property and light fastness.

JP 2007-277337 discloses a composition which is said to consist of 100 pts. wt. of an aromatic polycarbonate resin (component A) consisting of a specific repeating unit and 5-100 pts. wt. of a polyetherester (component B) consisting of (B1) an aromatic dicarboxylic acid not having a sulfonate group and/or its ester, (B2) an aromatic dicarboxylic acid containing a sulfonate group and/or its ester, (B3) a 2-10C glycol and (B4) a poly(alkylene oxide) glycol. The resulting polycarbonate resin composition is said to have excellent heat resistance and lasting antistatic property.

JP 2007-153932 describes a polycarbonate resin composition made of a polycarbonate resin and a boric acid ester of a polyhydric alcohol fatty acid ester and/or its salt.

JP 2007-063361 provides antistatic polycarbonate resin composition made of 100 pts. wt. polycarbonate resin (component A), 0.01-4 pts. wt. low-molecular-weight sulfonic acid salt (component B), and 0.001-1 pt. wt. phosphoric ester (component C). The antistatic polycarbonate resin composition is also said to further contain 0.01-5 pts. wt. polyetherester having a sulfonic acid salt group and/or a polyester having sulfonic acid salt group (component D), a hindered phenolic antioxidant, a phosphorous ester antioxidant, and an ultraviolet absorber. Molded articles made from the composition are said to be particularly suitable as a transparent member for vehicles.

U.S. Published Patent Application No. 2007/049703 describes a substantially transparent antistatic, impact resistant, molding composition and articles made from this composition. The composition includes a miscible mixture of a polycarbonate resin and a cycloaliphatic polyester resin, and an antistatic polymeric material wherein the mixture of the polycarbonate and the cycloaliphatic polyester resin is present in suitable proportions for substantially matching the index of refraction of the antistatic polymeric material, thereby enabling the composition, and any articles made from the composition, to be substantially transparent. The composition is said to be useful in a variety of articles in the electrical and electronic equipment, electronic packaging, and healthcare fields, as well as others.

JP 2006-257177 provides an antistatic polycarbonate resin composition said to have excellent transparency made of, based on 100 pts. wt. of a polycarbonate resin (A), 0.1-7 pts. wt. of an antistatic agent (B) and 0.1-5 pts. wt. of a polycaprolactone (C).

KR 2004-056713 describes an opaque polycarbonate resin composition prepared by formulating 100 parts of a base resin comprising 40-80% of a polycarbonate resin and 20-60% of an acrylonitrile-butadiene-styrene resin, 5-20 parts of an antistatic carbon black, and 0.3-1.0 part of a heat stabilizer. The compositions are said to have excellent antistatic property, tensile strength and impact strength. The compositions are limited to only opaque products in black color.

JP 2005-272663 describes an antistatic polycarbonate resin composition prepared by formulating 100 pts. wt. polycarbonate resin (A) with 0.5 to 5 pts. wt. antistatic agent (B) containing a specified phosphonium salt as the active component and 0.0001 to 1.0 pt. wt. specified imide lithium salt (C). The resulting composition is said to provide an antistatic polycarbonate resin composition excellent in heat resistance and transparency.

U.S. Pat. No. 7,220,792 discloses a water resistant permanent antistatic thermoplastic composition contains about 100 parts by weight of a thermoplastic polymer, such as polycarbonate or a blend thereof, about 0.1 to about 10 parts by weight of an antistatic agent, and about 0.1 to about 10 parts by weight of a polysiloxane-polyether copolymer.

JP 2005-146225 provides an antistatic polycarbonate resin composition comprises 100 pts. wt. of a polycarbonate resin (A) and, incorporated therewith, 0.1-7 pts. wt. of an antistat (B) containing, as an effective ingredient, a phosphonium salt and 0.0001-0.1 pt. wt. of a perfluoroalkane sulfonic acid metal salt (C). The resulting composition is said to be excellent in heat resistance and transparency.

JP 2004-083831 describes a polycarbonate resin is characterized by containing (A) 95-99.9 mass % polycarbonate resin and (B) 0.1-5 mass % perfluoroimide metal salt. The resulting transparent polycarbonate resin composition is said to have flame retardant property, without attaching dusts and exhibiting a continued anti-static performance.

JP 2003-176404 provides an antistatic polycarbonate resin composition made of (A) 100 parts wt. of a polycarbonate resin (component a), (B) 0.05-5 parts wt. of a specific benzenesulfonate phosphonium salt (component b) and (C) 0.001-0.8 part wt. of a specific aromatic sulfonic acid metal salt (component c). The resulting composition is said to have excellent antistatic performances and durability of the antistatic performances after dry-heat treatment and further excellent transparency in high-temperature/high-humidity conditions (wet-heat treatment) without lowering transparency, hue and molding heat resistance of a molding.

JP 2003-055544 describes a polycarbonate resin composition made of 100 pts. wt. of a polycarbonate resin and 0.1-100 pts. wt. of an inorganic electro-conductive substance. The resulting composition is said to be excellent in electroconductivity and antistatic properties, and given good appearance molded products without any adverse effect on the intrinsic merits of polycarbonate resins such as mechanical strength, heat resistance, dimensional stability.

U.S. Published Patent Application No. 2003/031844 describes a multi-layer structure of at least two thermoplastic layers in which at least one layer contains one or more antistatic compounds. The antistatic compounds are selected from perfluoroalkyl sulfonic acid salts, e.g., perfluoroalkyl sulfonic ammonium acid salts, perfluoroalkyl sulfonic phosphonium acid salts and perfluoroalkyl sulfonic sulfonium acid salts. The multi-layer structure may be selected from films, solid sheets and multi-walled sheets.

U.S. Pat. No. 5,360,658 provides antistatic extruded polycarbonate sheets produced from thermoplastic polycarbonates, polyalkylene terephthalates and carbon black, as well as processes for the production of such sheets.

JP 49-011949 provides an antistatic polycarbonate composition containing 0.1-5 phr fatty acid monoglyceride. However, the reported haze value was high.

U.S. Pat. No. 6,914,092 provides an agent suitable for imparting antistatic properties to plastics is disclosed. The incorporation of small amounts of organic salt of perfluoroalkylsulfonic acid in plastic resins, notably thermoplastic resins was found to be effective for this purpose.

One of the problems inherent in the art is that thermoplastics are electrical insulators. Including conducting materials, such as copper, into plastics can increase electrical conductivity. However, metal fillers will render opacity in a transparent matrix. To alleviate this problem, therefore, a need exists in the art for clear thermoplastics which have improved electrical conductivity without negatively affected clarity.

SUMMARY OF THE INVENTION

Accordingly, the present invention provides a transparent thermoplastic composition which has improved electrical conductivity. The transparent thermoplastic composition contains a transparent blend of polycarbonate and polyester resins, or a transparent copolyestercarbonate resin, or a transparent polyester resin.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a transparent thermoplastic molding composition containing one member selected from the group consisting of a transparent copolyestercarbonate resin, a transparent blend of a polycarbonate resin with a polyester resin, and a transparent polyester resin, from 0.005 weight percent to 2 weight percent, based on the weight of the composition, of a perfluoroalkylsulfonic acid salt of the formula (I): $(RA-SO_3^-)_n X^{n+}$ (I), wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements, and from 0 weight percent to 5 weight percent, based on the weight of the composition, of a glycerol monostearate (GMS), wherein the transparent thermoplastic molding composition has a total transmittance according to ASTM D-1003 of greater than 84% and an electric resistivity according to ASTM D-257 (at 277° C. after 1000 seconds electrification at 100 volts) of less than 2.5E+06 ohm-m.

The present invention further provides a process for the production of a transparent thermoplastic molding composition involving combining one member selected from the group consisting of a transparent copolyestercarbonate resin, a transparent blend of a polycarbonate resin with a polyester resin, and a transparent polyester resin, from 0.005 weight percent to 2 weight percent, based on the weight of the composition, of a perfluoroalkylsulfonic acid salt of the formula (I): $(RA-SO_3^-)_n X^{n+}$ (I), wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements and from 0 weight percent to 5 weight percent, based on the weight of the composition, of a glycerol monostearate (GMS), wherein the transparent thermoplastic molding has a total transmittance according to ASTM D-1003 of greater than 84% and an electric resistivity according to ASTM D-257 (at 277° C. after 1000 seconds electrification at 100 volts) of less than 2.5E+06 ohm-m.

The present invention also provides a process for improving the electrical conductivity of a transparent thermoplastic molding composition involving combining one member selected from the group consisting of a transparent copolyestercarbonate resin, a transparent blend of a polycarbonate resin with a polyester resin, and a transparent polyester resin, from 0.005 weight percent to 2 weight percent, based on the weight of the composition, of a perfluoroalkylsulfonic acid salt of the formula (I): $(RA-SO_3^-)_n X^{n+}$ (I), wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements and from 0 weight percent to 5 weight percent, based on the weight of the composition, of a glycerol monostearate (GMS), wherein the composition has a total transmittance according to ASTM D-1003 of greater than 84% and an electric resistivity according to ASTM D-257 (at 277° C. after 1000 seconds electrification at 100 volts) of less than 2.5E+06 ohm-m.

Suitable polycarbonate resins for preparing the composition of the present invention are homopolycarbonates and copolycarbonates, both linear or branched resins and mixtures thereof. As used herein, the term "polycarbonate" includes homopolycarbonates such as BPA polycarbonate, copolycarbonates derived from two or more different dihydric phenols, and copolyestercarbonates which include structural units derived from one or more dihydric phenols and one or more diacid derived structural units. The diacid, for example, includes dodecandioic acid, terephthalic acid, isophthalic acid. "Polyester" includes homopolyester and copolyester. U.S. Pat. No. 4,983,706 describes a method for making copolyestercarbonate.

The polycarbonates have a weight average molecular weight of preferably 10,000 to 200,000, more preferably 20,000 to 80,000 and their melt flow rate, per ASTM D-1238 at 300° C. and 1.2 kg weight, is preferably 1 to 65 g/10 min., more preferably 2 to 35 g/10 min. They may be prepared, for example, by the known diphasic interface process from a carbonic acid derivative such as phosgene and dihydroxy compounds by polycondensation (See, German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964).

In the present context, dihydroxy compounds suitable for the preparation of the polycarbonates of the invention conform to the structural formulae (1) or (2) below.

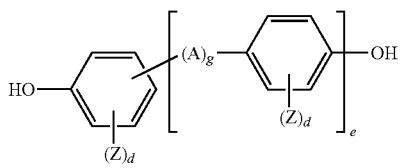
(1)

wherein

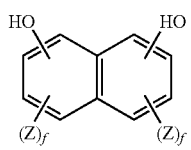
(2)

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

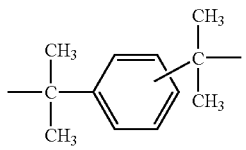

e and g both denote the number 0 to 1;
Z denotes F, Cl, Br or C$_1$-C$_4$-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxy-phenyl)-ethers, bis-(hydroxyphenyl)-ketones, bis-(hydroxy-phenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,401,826, 5,105,004; 5,126,428; 5,109,076; 5,104,723; 5,086,157; 3,028,356; 2,999,835; 3,148,172; 2,991,273; 3,271,367; and 2,999,846, the contents of which are incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxy-phenyl)-propane, 4,4'-dihydroxy-diphenyl, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxy-phenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxy-phenyl)-3,3,5-trimethylcyclohexane. The most preferred bisphenol is 2,2-bis-(4-hydroxy-phenyl)-propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpoly-carbonates such as are described in U.S. Pat. Nos. 3,036,036 and 4,210,741, both of which are incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514, which is incorporated herein by reference. The following are some examples of poly-hydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxy-phenyl)-2-(2,4-dihydroxy-phenyl)-propane and 1,4-bis-(4,4'-dihydroxytri-phenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are poly-condensation in a homogeneous phase and transesterification. The suitable processes are disclosed in U.S. Pat. Nos. 3,028,365; 2,999,846; 3,153,008; and 2,991,273 which are incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used. Suitable polycarbonate resins are available in commerce, for instance, from Bayer MaterialScience LLC under the MAKROLON trademark.

The term polyester as used herein is meant to include homo-polyesters and co-polyesters resins. These are resins the molecular structure of which include at least one bond derived from a carboxylic acid, preferably excluding linkages derived from carbonic acid. These are known resins and may be prepared through condensation or ester interchange polymerization of the diol component with the diacid according to known methods. Examples are esters derived from the condensation of a cyclohexanedimethanol with an ethylene glycol with a terephthalic acid or with a combination of terephthalic acid and isophthalic acid. Also suitable are polyesters derived from the condensation of a cyclohexane-dimethanol with an ethylene glycol with a 1,4-cyclohexanedicarboxylic acid.

Preferred polyester resins include, but are not limited to, poly(cyclohexanedimethanol terephthalate) ("PCT"), poly(cyclohexane-dimethanol-co-ethylene terephthalate) ("PCTG"), glycol-modified polyethylene terephthalate ("PETG"), poly(1,4-cyclohexanedimethyl-1,4-cyclohexanedicarboxylate) ("PCCD") and mixtures thereof.

Transparent blends of polycarbonate and polyester can be obtained by physical blending, such as by solution blending or by compounding, or by reactive blending where transesterification takes place between polycarbonate and polyester resulting in generation of some copolymers of polycarbonate and polyester. The transparent blend of polycarbonate resin and polyester resin in the present invention may contain a transparent polycarbonate and/or a transparent polyester or neither component may be transparent so long as the resulting blend of the two is transparent. Transparent blends of polycarbonate and polyester by physical blending are disclosed, for example, in U.S. Pat. No. 4,879,355, U.S. Published Patent Application No. 2005/137358, in *Industrial & Engineering Chemistry Research* (2006), 45(26), 8921-8925. Transparent blends of polycarbonate and polyester by reactive blending are disclosed, for example, in *European Polymer Journal* 37 (2001) 1961-1966, *Journal of Polymer Science: Part B: Polymer Physics*, Vol. 37, 2960-2972 (1999), *Macromol. Chem. Phys.* 2002, 203, 695-704, Polymer, Vol. 38, 195-200 (1997).

The inventive composition includes one or more perfluoroalkylsulfonic acid salts of the formula (I):

$$(RA-SO_3^-)_n X^{n+} \qquad (I),$$

wherein R denotes perfluorinated linear or branched carbon chain having 1 to 30 carbon atoms, A denotes a direct bond or an aromatic nucleus, n denotes an integer of 1 or 2, and X denotes a metal element selected from the first column or the second column in the Periodic Table of the Elements (e.g., Li, Na, K, Cs, Ca, Mg, Ba)

Perfluoroalkylsulfonic acid salts are known or may be produced using known methods. The salts of the sulfonic acids may be produced by combining equimolar quantities of the free sulfonic acid with the hydroxy form of the corresponding cation in water at room temperature and evaporating the solution.

The one or more perfluoroalkylsulfonic acid salts are preferably included in the compositions of the present invention in amounts of 0.005 weight percent to 2 weight percent, more preferably 0.005 weight percent to 1 weight percent, based on the weight of the composition. The one or more perfluoroalkylsulfonic acid salts may be present in the compositions of the present invention in an amount ranging between any combination of these values, inclusive of the recited values.

The inventive compositions also may include a glycerol monostearate (GMS), which is commonly included in plastics as a mold release agent, in amounts of 0 weight percent to 5 weight percent, more preferably from greater than 0 weight percent to 5 weight percent and most preferably from 0.03 weight percent to 1 weight percent, based on the weight of the composition. The glycerol monostearate (GMS) may be present in the compositions of the present invention in an amount ranging between any combination of these values, inclusive of the recited values.

The present inventors have surprisingly discovered that the combination of perfluoroalkylsulfonic acid salt and glycerol monostearate has a synergistic effect in improving the electrical conductivity of a transparent thermoplastic composition without affecting the clarity of the composition.

The composition of the present invention may be used in preparing useful articles by any method of thermoplastic processing including injection molding and extrusion.

EXAMPLES

The present invention is further illustrated, but is not to be limited, by the following examples. All quantities given in "parts" and "percents" are understood to be by weight, unless otherwise indicated. The following materials were used in the preparations of the examples:

| | |
|---|---|
| POLYCARBONATE A | a linear polycarbonate having melt volume rate ("MVR") at 300° C./1.2 kg of 19 cm³/10 min, available from Bayer MaterialScience as MAKROLON 2408; |
| POLYCARBONATE B | homopolycarbonate based on bisphenol A, having melt volume rate ("MVR") at 300° C./1.2 kg of 12.5 cm³/10 min, available from Bayer Material Science as MAKROLON 2608; |
| RELEASE AGENT A | a mixture of fatty acid esters available from Cognis Corp. as LOXIOL HOB 7119; |
| RELEASE AGENT B | a glycerol monostearate (GMS) available from Danisco as DIMODAN HAB; |
| COPOLYESTER | a PCTG copolyester available from Eastman as DN001; |
| PHOSPHITE | available from Clariant as HOSTANOX PEPQ; |
| FLAME RETARDANT | potassium diphenylsulfone sulfonate, a non-halogen flame retardant available from Arichem LLC as KSS-FR; and |
| PFAS ACID SALT | potassium perfluorobutane sulfonate |

For the following examples, the Vicat softening temperature was determined according to ASTM D-1525, the total transmittance and percent haze according to ASTM D-1003, and the electrical resistivity according to ASTM D-257 (at 277° C. after 1000 seconds electrification at 100 volts).

Comparative Examples 1-3 and Examples 4-6

Table I summarizes the makeup and relevant properties of the exemplified compositions. As is apparent by reference to Table I, the inventive compositions exhibit improved the electrical conductivity while retaining the clarity of the polycarbonate material. Inventive Examples 4-6 exhibit electrical resistivity at 277° C. less than 2.5E+06 ohm-m, whereas the Comparative Examples exhibit electrical resistivity at 277° C. greater than or equal to 2.6E+6 ohm-m. Inventive Example 6 also exhibits synergistic effect between the potassium perfluorobutane sulfonate and GMS on electrical resistivity.

TABLE I

| | Ex. C-1 | Ex. C-2 | Ex. C-3 | Ex. 4 | Ex. 5 | Ex. 6 |
|---|---|---|---|---|---|---|
| Component | | | | | | |
| POLYCARBONATE A | 29 | 29 | 29 | 29 | 29 | 29 |
| POLYCARBONATE B | 29 | 29 | 29 | 29 | 29 | 29 |
| COPOLYESTER | 42 | 42 | 42 | 42 | 42 | 42 |
| PHOSPHITE | 0.2 | 0.2 | 0.2 | 0.2 | 0.2 | 0.2 |
| RELEASE AGENT A | 0.5 | — | — | 0.5 | 0.5 | — |
| RELEASE AGENT B | — | 0.5 | 0.5 | — | — | 0.5 |
| PFAS ACID SALT | — | — | — | 0.03 | 0.06 | 0.03 |
| FLAME RETARDANT | — | — | 0.03 | — | — | — |
| Physical Properties | | | | | | |
| Vicat (° C.) | 114 | 111 | 111 | 112 | 111 | 111 |
| Total transmittance (%) | 88.8 | 89.2 | 88.6 | 89.1 | 89.3 | 88.8 |
| Percent haze (%) | 1.4 | 0.7 | 0.7 | 0.6 | 0.7 | 0.7 |
| Electrical resistivity (ohm-m) | 2.5E+07 | 2.6E+06 | 4.3E+06 | 6.3E+05 | 3.9E+05 | 4.3E+05 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A transparent thermoplastic molding composition consisting of:
   one or more polycarbonates resins;
   a transparent polyester resin selected from the group consisting of poly(cyclohexanedimethanol terephthalate), poly(cyclohexanedimethanol-co-ethylene terephthalate), glycol-modified polyethylene terephthalate, poly(1,4-cyclohexanedimethyl-1,4-cyclohexanedicarboxylate) and mixtures therof;
   from about 0.005 weight percent to about 2 weight percent, based on the weight of the composition, of a perfluoroalkylsulfonic acid salt of the formula (I):

   $$(RA-SO_3^-)_n X^{n+} \qquad (I),$$

wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements; and
   from about 0 weight percent to about 5 weight percent, based on the weight of the composition, of a glycerol monostearate (GMS),
   wherein the transparent thermoplastic molding composition has a total transmittance according to ASTM D-1003 of greater than about 84% and an electric resistivity according to ASTM D-257 (at 277° C. after 1000 seconds electrification at 100 volts) of less than about 2.5E+06 ohm-m.

2. The transparent thermoplastic molding composition according to claim 1, wherein the polycarbonate resin is blended with the polyester resin.

3. The transparent thermoplastic molding composition according to claim 1, wherein the polycarbonate is selected from the group consisting of homopolycarbonates, copolycarbonates and copolyestercarbonates.

4. The transparent thermoplastic molding composition according to claim 1, wherein the metal element X is selected from the group consisting of Li, Na, K, Cs, Ca, Mg and Ba.

5. The transparent thermoplastic molding composition according to claim 1, wherein the perfluoroaalkylsulfonic acid salt is selected from the group consisting of lithium perfluorobutanesulfonate, sodium perfluorobutanesulfonate, potassium perfluorobutanesulfonate, cesium perfluorobutanesulfonate, magnesium perfluorobutanesulfonate, calcium perfluorobutanesulfonate, barium perfluorobutanesulfonate.

6. The transparent thermoplastic molding composition according to claim 1, wherein the perfluoroalkylsulfonic acid salt comprises from about 0.005 weight percent to about 1 weight percent of the composition.

7. The transparent thermoplastic molding composition according to claim 1, wherein the glycerol monostearate (GMS) comprises from about 0.03 weight percent to about 1 weight percent of the composition.

8. A process for the production of a transparent thermoplastic molding composition consisting of combining:
   one or more polycarbonate resins;
   a transparent polyester resin selected from the group consisting of poly(cyclohexanedimethanol terephthalate), poly(cyclohexanedimethanol-co-ethylene terephthalate), glycol-modified polyethylene terephthalate, poly(1,4-cyclogexanedimethyl-1,4-cyclohexanedicarboxylate) and mixtures thereof;
   from about 0.005 weight percent to about 2 weight percent, based on the weight of the composition, of a perfluoroalkylsulfonic acid salt of the formula (I):

   $$(RA-SO_3^-)_n X^{n+} \qquad (I),$$

wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements; and
   from about 0 weight percent to about 5 weight percent, based on the weight of the composition, of a glycerol monostearate (GMS),
   wherein the transparent thermoplastic molding has a total transmittance according to ASTM D-1003 of greater than about 84% and an electric resistivity according to ASTM D-257 at 277° C. after 1000 seconds electrification at 100 volts of less than about 2.5E+06 ohm-m.

9. The process according to claim 8, wherein the polycarbonate resin is blended with the polyester resin.

10. The process according to claim 8, wherein the metal element X is selected from the group consisting of Li, Na, K, Cs, Ca, Mg and Ba.

11. The process according to claim 8, wherein the perfluoroalkylsulfonic acid salt is selected from the group consisting of lithium perfluorobutanesulfonate, sodium perfluorobutanesulfonate, potassium perfluorobutanesulfonate, cesium perfluorobutanesulfonate, magnesium perfluorobutanesulfonate, calcium perfluorobutanesulfonate, barium perfluorobutanesulfonate.

12. The process according to claim 8, wherein the glycerol monostearate (GMS) comprises from about 0.03 weight percent to about 1 weight percent of the composition.

13. A process for improving the electrical conductivity of a transparent thermoplastic molding composition consisting of combining:
   one or more polycarbonate resins;
   a transparent polyester resin selected from the group consisting of poly(cyclohexanedimethanol terephthalate), poly(cyclohexanedimethanol-co-ethylene terephthalate), glycol-modified polyethylene terephthalate, poly(1,4-cyclohexanedimethyl-1,4-cyclohexanedicarboxylate) and mixtures thereof;
   from about 0.005 weight percent to about 2 weight percent, based on the weight of the composition, of a perfluoroalkylsulfonic acid salt of the formula (I):

   $$(RA-SO_3^-)_n X^{n+} \qquad (I),$$

wherein R denotes perfluorinated linear or branched carbon chain having 1 to 30 carbon atoms, A denotes a direct bond or an aromatic nucleus, n denotes an integer of 1 or 2, and X denotes a metal element selected from the first or the second column in the Periodic Table of the Elements; and
   from about 0 weight percent to about 5 weight percent, based on the weight of the composition, of a glycerol monostearate (GMS),
   wherein the transparent thermoplastic molding has a total transmittance according to ASTM D-1003 of greater than about 84% and an electric resistivity according to ASTM D-257 at 277° C. after 1000 seconds electrification at 100 volts of less than about 2.5E+06 ohm-m.

14. The process according to claim 13, wherein the polycarbonate resin is blended with the polyester resin.

15. The process according to claim 13, wherein the metal element X is selected from the group consisting of Li, Na, K, Cs, Ca, Mg and Ba.

16. The process according to claim 13, wherein the perfluoroalkylsulfonic acid salt is selected from the group consisting of lithium perfluorobutanesulfonate, sodium perfluorobutanesulfonate, potassium perfluorobutanesulfonate, cesium perfluorobutanesulfonate, magnesium perfluorobutanesulfonate, calcium perfluorobutanesulfonate, barium perfluorobutanesulfonate.

17. The process according to claim 13, wherein the glycerol monostearate (GMS) comprises from about 0.03 weight percent to about 1 weight percent of the composition.

* * * * *